May 24, 1960   D. G. DILL   2,938,185
ELECTRICAL FUNCTION GENERATOR
Filed July 9, 1958
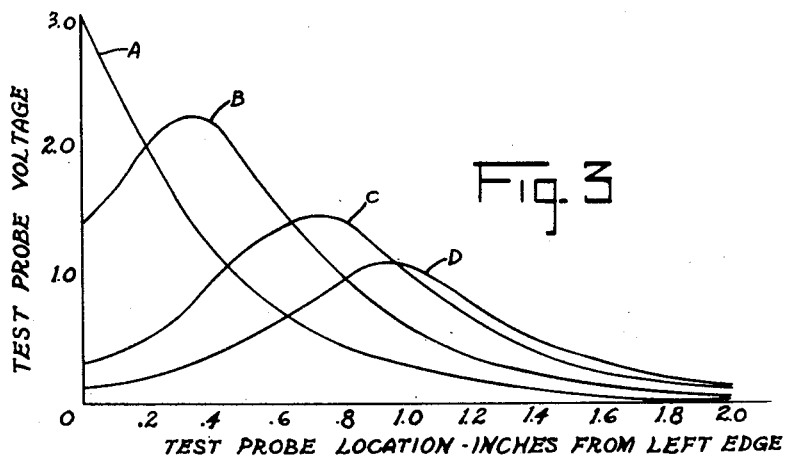
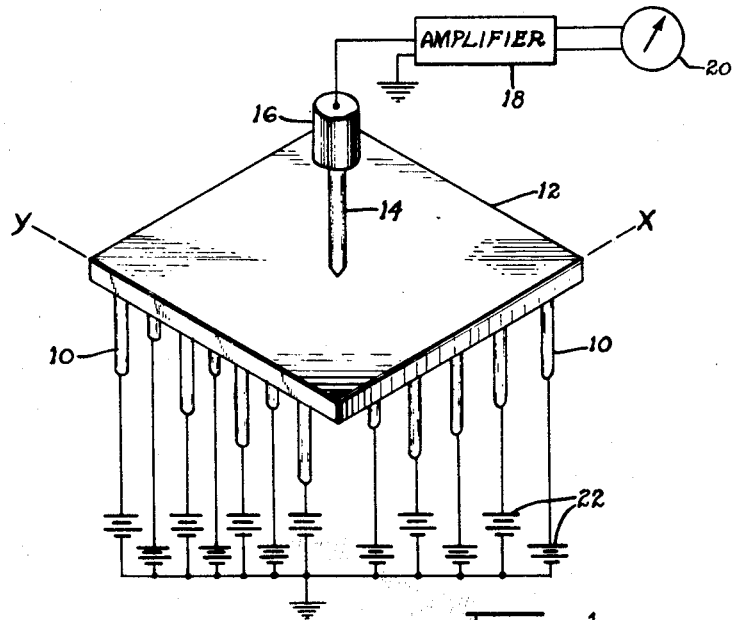
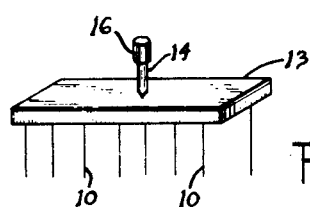
INVENTOR.
DOUGLAS G. DILL, Deceased
by BEATRICE J. DILL, Administratrix
BY Lawrence S. Epstein
ATTORNEYS

United States Patent Office 2,938,185
Patented May 24, 1960

2,938,185

ELECTRICAL FUNCTION GENERATOR

Douglas G. Dill, deceased, late of Los Angeles, Calif., by Beatrice J. Dill, special administratrix, Los Angeles, Calif., assignor, by mesne assignments, to the United States of America as represented by the Secretary of the Navy Filed July 9, 1958, Ser. No. 747,552

6 Claims. (Cl. 338—89)

This invention relates to function generators and especially to function generators of the smooth-potentiometer type.

Function generators are useful in various computer applications, as for example, in the provision of voltages for analogue computers employed in operational flight trainers. The voltages supplied to the computers are in accordance with mathematical equations which express the aerodynamical characteristics of aircraft which the flight trainers simulate. Potentiometers are one type of function generator since they provide voltages which vary, linearly or otherwise, with the movement of a contact arm.

The present invention comprises a function-generating device having a plurality of spaced electrodes for forming a desired electric field pattern, the field between the electrodes being smoothed by passage through a three-dimensional medium of uniform resistive material. The output field potential is derived by moving a brush or probe in contact with the upper surface of the three-dimenisonal medium.

The device may be employed as a two-variable function generator if the contact arm is movable across the surface of the medium in the X and Y directions of a rectangular coordinate system; or it may be employed as a single-variable function generator, or a smoothing potentiometer, if the contact arm is movable in a single direction along the surface.

A particular advantage of the invention is the ease with which the field pattern for any arbitrary function may be produced or altered merely by varying the electrode voltages or placement. This provides unusual flexibility for the device.

An object of the invention is to provide a function generator which can be arranged to supply a potential in accordance with any desired arbitrary mathematical function.

Another object is to provide for easy alteration of the field pattern of a plurality of spaced electrodes.

Yet another object is to provide a function generator having an output which varies in accordance with a two-variable mathematical function.

A further object is to smooth out the unevenness of the electric field pattern established between a plurality of spaced electrodes.

Other objects and many of the attendant advantages of this invention will be readily appreciated as the same becomes better understood by reference to the following detailed description when considered in connection with the accompanying drawings wherein:

Fig. 1 is a combined perspective view and schematic diagram of an embodiment of a two-variable function generator.

Fig. 2 is a perspective view of an embodiment of a one-variable function generator.

Fig. 3 is a graph showing output voltage functions obtainable from the embodiment of Fig. 2.

Fig. 1 illustrates an embodiment of a two-variable function generator in which a plurality of spaced electrodes 10 are affixed to the bottom surface of a three-dimensional plate 12 composed of a material having uniform resistivity per unit volume. An arm or probe 14 makes contact with the upper surface of the plate 12 and may be moved in the X and Y directions by a pair of servo motors (not shown) or any other convenient means.

The electrodes 10 may be made of conductive material such as copper and may be either permanently or movably affixed to the bottom surface of the plate 12. Not all the electrodes can be seen due to the perspective of the drawing.

The contact arm 14 is also formed from a conductive material such as copper, although it might even be a graphite pencil. The contact arm 14 may be coupled by capacitive means such as a coupling sleeve 16 to an amplifier 18, the output of which is indicated by a meter 20.

The electric field pattern required to provide a desired function is established by connecting the proper value of potential between each electrode and ground. These values are not necessarily the same for each electrode and may be provided by any convenient means such as batteries or voltage dividers. The batteries 22 are utilized here merely as a convenient symbol for sources of potential.

The plate 12 provides a medium which smoothes out the abrupt variations of the field as it exists along a plane contacting the tips of the electrodes (e.g., the bottom surface of the plate 12). The thicker the plate 12, the greater the degree of smoothing and the weaker the field intensity at the upper surface of the plate.

Establishment of the desired field pattern may be accomplished by trial-and-error, graphical plotting of the electric lines of intensity or the mathematical method of influence coefficients. A discussion of the method of influence coefficients as related to this particular problem follows:

Let the electrodes be numbered 1 through N. Choose any set of M points located on the surface swept by the contact arm and designate their positions by the numbers 1 through M. By impressing a unit voltage at the $j$th electrode while grounding all others and measuring the resultant voltages at each of the set of M points, a set of influence coefficient $G_{ij}$ is obtained.

Then by the principle of superposition, the following equation is obtained:

$$V_i = \sum_{j=1}^{N} (C_{ij}E_j) \quad i=1, 2 \ldots M$$

where $V_i$ is the measured voltage at the $i$th point
$C_{ij}$ is the voltage at the $i$th point due to a unit voltage at the $j$th point
$E_j$ is the applied voltage at the $j$th electrode Written in matrix form the above equations become $$\{V_i\} = [C_{ij}]\{E_j\}$$

where the braces { } are used to denote a column matrix.

The problem at hand is to determine the values $E_j$ as a function of $V_i$. If we set $M=N$, the immediate solution is $$\{E_j\} = [C_{ij}]^{-1}\{V_i\}$$

Although the specification of values of $V_i$ for N points will determine the necessary voltages to be applied to match the given function at the chosen points, it does not take into consideration the behavior of the function between the chosen points. Hence the degree of accuracy over the entire range of operation may vary widely.

To overcome this difficulty M can be chosen considerably greater than N and the values of $E_j$ are then determined which will minimize the expression $$i = \sum_1^M (V_i{}^1 - V_i)^2$$

where $V_i{}^1$ and $V_i$ are respectively the desired and resultant voltage at the $i$th point. These values are given by the matrix equation $$\{E_j\} = ([C_{ij}]^*[C_{ij}])^{-1}[C_{ij}]^*V_i$$

Utilization of a high speed electronic computer facilitates the solution of these equations.

Fig. 2 illustrates an embodiment of a simple smoothing potentiometer. The smoothing medium is a strip 13 of resistive material approximately 2 inches long, ¼ inch wide and ½ inch deep. The electrodes 10 are located 0, .4, .8, 1.0, 1.2, 1.4, 1.6 and 2 inches from the left edge. The result of applying 5 volts to the first electrode and grounding all other electrodes is shown in curve A of Fig. 3. Fig. 3 also shows the smoothing effect when a potential is applied individually to three of the other electrodes.

Obviously many modifications and variations of the present invention are possible in the light of the above teachings. It is therefore to be understood that within the scope of the appended claims the invention may be practiced otherwise than as specifically described.

What is claimed is:

1. An electrical function-generating device comprising, in combination: a member having upper and lower opposed faces, said member being fabricated from material having uniform electrical resistivity per unit volume; a plurality of field-establishing means spaced from each other and in contact with the lower of said opposed faces, said resistive member acting as a smoothing means for reducing the abruptness of the variations in potential between said field-establishing means so that the field appearing on said upper face varies in a smoother manner than the field appearing on said lower face; and potential-deriving means in contact with the surface of the upper of said opposed faces, said potential-deriving means being movable along a predetermined path whereby a specific function of electric potential may be derived.

2. An electrical function-generating device comprising, in combination: a member having upper and lower opposed faces, said member being fabricated from a material having uniform resistive characteristics; a plurality of field-establishing means spaced from each other and in contact with the lower of said opposed faces, the spacing and arrangement of said field-establishing means being in accordance with a predetermined plan for establishing a desired electric field pattern along the surface of the upper of said opposed faces, said resistive member acting as a smoothing means for reducing the abruptness of the variations in potential between said field-establishing means so that the field appearing on said upper face varies in a smoother manner than the field appearing on said lower face; and potential-deriving means in contact with the surface of said upper face, said potential-deriving means being movable along a predetermined path whereby a specific function of electric potential may be derived.

3. A device as set forth in claim 2, wherein said field-establishing means are movable.

4. A device as set forth in claim 2, including means for moving said potential-deriving means along said predetermined path.

5. An electrical function-generating device comprising, in combination: a plate having opposed upper and lower faces, said plate being fabricated from material having uniform electrical resistivity per unit volume; a plurality of electrodes spaced from each other and in contact with the lower of said opposed faces, the spacing and arrangement of said electrodes being in accordance with a predetermined plan for establishing a desired electric field pattern along the surface of the upper of said opposed faces, said resistive member acting as a smoothing means for reducing the abruptness of the variations in potential between said electrodes so that the field appearing on said upper face varies in a smoother manner than the field appearing on said lower face; and a contact element in contact with the surface of said upper face, said contact element being movable along a predetermined path whereby a specific function of electric potential may be derived.

6. A device as set forth in claim 5, including means to move said contact element along said predetermined path.

References Cited in the file of this patent

UNITED STATES PATENTS

| 2,542,478 | Clark | Feb. 20, 1951 |
| 2,680,177 | Rosenthal | June 1, 1954 |

FOREIGN PATENTS

| 634,073 | Germany | July 30, 1936 |

Notice of Adverse Decision in Interference

Interference No. 91,367 involving Patent No. 2,938,185, D. G. Dill, ELECTRICAL FUNCTION GENERATOR, final judgment adverse to the patentee was rendered Mar. 24, 1966, as to claims 4 and 6.

[*Official Gazette October 25, 1966.*]